INVENTOR.
Roy V. Harrington
BY Clarence R. Bailey Jr.
ATTORNEY

United States Patent Office 3,356,579
Patented Dec. 5, 1967

3,356,579
RADIATION WINDOW GLASS
Roy V. Harrington, Corning, N.Y., assignor to Corning Glass Works, Corning, N.Y., a corporation of New York
Filed Jan. 29, 1964, Ser. No. 340,939
1 Claim. (Cl. 106—53)

ABSTRACT OF THE DISCLOSURE

Glasses having a high resistance to gamma radiation based on a system of potassium lead silicate and containing a minor amount of cerium oxide.

This invention relates to glasses having a high degree of resistance to the adverse effects of gamma radiation and suitable for use in the manufacture of windows for viewing radioactive areas. In particular this invention is concerned with moderately dense glasses which are highly resistant to discoloration and to dielectric breakdown under the influence of strong directional gamma ray fluxes.

It is frequently desirable to permit visual observation of processes and experiments where radioactivity is present, such as, in atomic energy installations. Dense glasses capable of absorbing gamma radiations have been developed for the manufacture of observation windows in such installation. Such glasses are disclosed in U.S. Patent No. 2,856,303 to Armistead and U.S. Patent No. 3,046,148 to Middleswarth et al. It has been found however that glasses heretofore used for such purposes are limited in their ability to withstand higher doses of radiation, that is, on the order of up to about $10^8$ roentgens of gamma rays. On exposure to such higher doses of radiation, the glasses will frequently discolor and become unsuitable for use as viewing windows. The discoloration is believed due to the absorption of gamma rays which produce color centers which absorb visible radiation. In addition it has been found that exposure to higher doses of radiation frequently results in a catastrophic dielectric breakdown of the glass, resulting from high potential static charges which build up on the glass. Furthermore, the build up of such high potential static changes presents an electrical safety hazard.

It is an object of the present invention to provide dense glasses suitable for the manufacture of radiation shielding windows which will have a high initial luminous transmission and which are highly resistant to discoloration and to dielectric breakdown under gamma radiation up to at least $10^8$ roentgens. It is a further object to provide a radiation shielding glass window.

In accordance with the present invention these objects are realized in a halogen-free glass consisting essentially of, in percent by weight, as calculated from the batch 41–50% $SiO_2$, 30–36% PbO, 2.0–3.5% $CeO_2$, and 16–21% $K_2O$. Such glasses have densities ranging from about 3.1–3.5 and exhibit an initial luminous transmittance of greater than 90% at about 5500 angstroms, for a glass thickness of 1 inch.

The problem of dielectric breakdown resulting from strong directional gamma ray fluxes is overcome in the glasses of the present invention by maintaining a low resistivity. The low resistivity permits the ready relaxation of the charges which tend to build up in the glass. Excellent resistance to dielectric breakdown from gamma radiation of up to about $10^8$ roentgens is obtained in a glass wherein the logarithm of the resistivity at 50° C. is less than about 16.5.

The advantages of the glasses of the present invention are further shown with reference to the accompanying drawings wherein.

Figure 1:
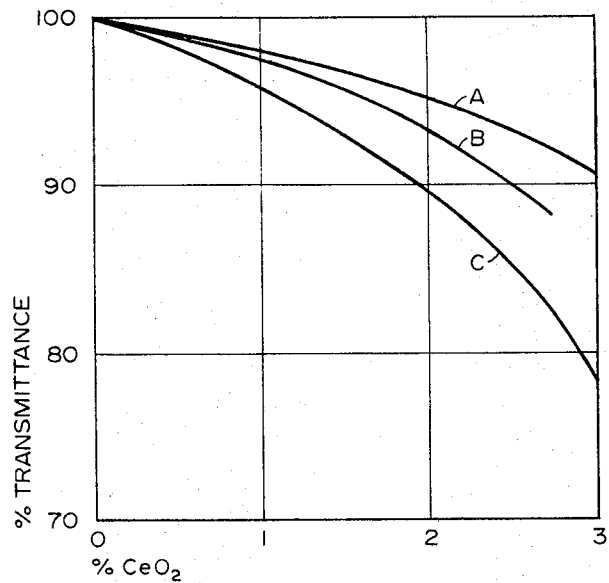
FIGURE 1 shows the effect of increasing amounts of ceric oxide on the initial transmittance ($I_o$) of a glass of the present invention and two glasses having base compositions shown in the prior art to be useful for radiation shielding window glasses.
Figure 2:
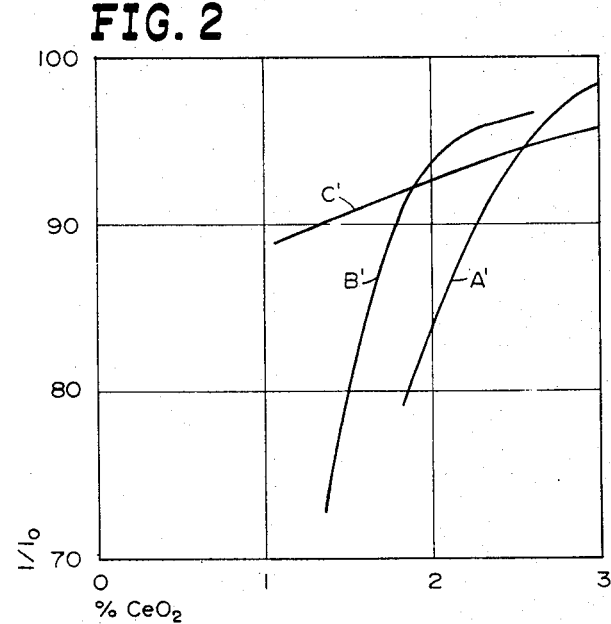
FIGURE 2 shows the effect of increasing amounts of ceric oxide, for the same base glasses as FIG. 1, on resistance to darkening from exposure to $10^8$ roentgens of gamma rays.

In FIGURES 1 and 2 curves A and A' represent varying ceric oxide concentrations in a base glass of the present invention comprising 50% $SiO_2$, 33% PbO and 17% $K_2O$. Ceric oxide is added in substitution for $SiO_2$ so that a glass containing 2% ceric oxide contains only 48% $SiO_2$. Similarly curves B and B' represent a base glass comprising 45% $SiO_2$, 33% PbO, 2% $Al_2O_3$, 6% $Na_2O$ and 14% $K_2O$. Curves C and C' represent a base glass comprising 47% $SiO_2$, 33% PbO, 12% $Na_2O$ and 8% $K_2O$. Here again, ceric oxide is substituted for $SiO_2$ in the glasses represented by the curve. The plotted transmittance data shown was obtained for a one inch thickness of glass, and an illumination source of 5500 A.

With reference to FIGURE 1 it will be noted that the glasses represented by curve A which are representative of the glasses of the present invention, exhibit a higher initial luminous transmittance for a given amount of ceric oxide than do the glasses represented by curves B and C which are representative of the glasses of the aforementioned Armistead patent. The differences in initial luminous transmittance become even more pronounced in the region where ceric oxide is present in excess of about 2%.

FIG. 2 shows the resistance to darkening of the same glass compositions after exposure to gamma irradiation of $10^8$ roentgens. Curves A', B' and C' illustrate the dependency of the transmittance of irradiated glasses on the ceric oxide content of the glass and the effect of base glass composition on the efficiency of ceric oxide in preventing discoloration from gamma rays. In obtaining the data from which the curves were plotted, the transmittance at 5500 A. was measured for glasses of varying ceric oxide content. This initial transmittance ($I_o$) is plotted in FIG. 1. The glasses were then exposed to gamma irradiation of $10^8$ roentgens and, after 10 minutes fading time, the transmittance (I), at 5500 A., was again measured. The vertical scale of FIG. 2 represents the transmittance measured after irradiation, divided by the initial transmittance, multiplied by 100, or $I/I_o \times 100$.

Variations in the compositions of the glasses of the present invention should be confined within the limits set forth above on the basis of the following considerations:

Greater than 41% silica is necessary to provide adequate resistance to weathering, such as, from high humidity conditions. However, if the percentage of silica exceeds about 50% the resulting glass is difficult to melt and has a density too low for radiation shielding purposes. PbO is added to increase the density of the composition for radiation shielding purposes. However, in amounts in excess of about 36%, the PbO causes excessive decrease in the luminous transmission of the glass.

In order to obtain the low resistivity and resistance to dielectric breakdown desired in the glasses of the present invention, the glasses should contain a minimum of 16% by weight $K_2O$. If $K_2O$ exceeds about 21%, weathering resistance of the glass is unduly lowered.

At least 2.0%, by weight, $CeO_2$ is required to prevent the discoloration which would otherwise result when the glass is subjected to higher doses of radiation, such as, on the order of $10^8$ roentgens. A relatively pure grade of $CeO_2$ should be employed. In particular, the presence of neodymium and praseodymium should be avoided because of their adverse effect on the initial luminous transmission of the glass. However, if the $CeO_2$ exceeds about 3.5%, the initial luminous transmission of the glass is objectionably lowered.

In order to obtain low resistivity and high luminous transmittance in a glass that is stable to discoloration during irradiation, it is preferred that the glasses be substantially free of $Na_2O$ and $Li_2O$. The presence of $Na_2O$ or $Li_2O$ as impurities in batch constituents may be tolerated in amounts up to about 1% by weight.

If $Na_2O$ or $Li_2O$ is present in amounts of between about 1% and 10% by weight the electrical resistivity of the glass is increased unduly. If greater than 10% by weight $Na_2O$ or $Li_2O$ is present a satisfactorily low electrical resistivity may be obtained, but the luminous transmittance of such a glass, when $CeO_2$ is added, is too low for practical use as a radiation shielding window. This may be seen with reference to curve C of FIG. 1 which illustrates the initial transmittance of a glass containing 12% $Na_2O$. However, the presence of these oxides as impurities in amounts of less than about 1.0% by weight, may be tolerated with only a slight lowering of the transmission and increase of resistivity.

The presence of halogens is to be avoided in the glasses of the present invention. Glasses previously used for radiation windows have employed fluorides to aid in melting and to increase the luminous transmission of the glass. However, I have found that a higher degree of resistance to dielectric breakdown is achieved in glasses which are free of halides. In particular, the addition of as little as 0.75% by weight fluorine was found to increase the logarithm of the resistivity at 50° C. about 0.5. I have further found that resistance to darkening from exposure to gamma rays is lowered by the presence of halogens other than fluorine.

By way of further illustration of the present invention, Table I, below, shows three glass compositions, given in terms of oxide composition in percent by weight as calculated from the batch, typical of the glasses of the present invention. Example 1 represents the composition of a preferred glass of the present invention.

TABLE I

| Examples | 1 | 2 | 3 |
| --- | --- | --- | --- |
| $SiO_2$ | 47.2 | 44.1 | 41.5 |
| $PbO$ | 33 | 33 | 36 |
| $K_2O$ | 17 | 20 | 20 |
| $CeO_2$ | 2.8 | 2.9 | 2.5 |

Each of the above glasses exhibited a density of between 3.2 and 3.4 and an electrical resistivity in terms of the logarithm of the resistivity at 50° C. of less than 16.5

The glasses may be prepared from conventional batch ingredients such as those set forth in Table II, below, wherein the batch compositions, 1, 2 and 3 correspond to the oxide compositions set forth in Table I, above.

TABLE II

| Batch Ingredient | Batch Compositions [1] | | |
| --- | --- | --- | --- |
| | 1 | 2 | 3 |
| Pulv. Sand | 5,190 | 4,410 | 622 |
| Litharge | 3,630 | 3,630 | 540 |
| Potassium Nitrate | 477 | 477 | 64.7 |
| Potash | 2,420 | 2,907 | 397 |
| Ceric Oxide | 308 | 319 | 37.5 |

[1] Parts by weight.

The glasses of the present invention as exemplified by the compositions set forth above may be melted in a conventional glass melting tank at temperatures of about 1300 to 1550° C. under non-reducing conditions. The use of additional fining agents is not required since the $CeO_2$ functions as a fining agent.

It will be apparent to those skilled in the art that variations and modifications of the invention as hereinabove set forth may be made without departing from the spirit and scope of the invention. The invention is not limited to those details shown above except as set forth in the appended claim.

I claim:

A glass, resistant to dielectric breakdown from gamma radiation of up to about $10^8$ roentgens, consisting essentially on the oxide basis as calculated from the batch of 47.2% by weight $SiO_2$, 33% by weight PbO, 17% by weight $K_2O$ and 2.8% by weight of $CeO_2$, said glass being characterized in being substantially free of halogens, soda, and lithia, having an initial luminous transmittance for a one inch thickness of greater than 90% at a wave length of 5500 A., and having an electrical resistivity in terms of the log of the resistivity at 50° C. of less than 16.5.

References Cited
UNITED STATES PATENTS

| | | | |
| --- | --- | --- | --- |
| 2,392,314 | 1/1946 | Dalton | 161—196 |
| 2,477,329 | 7/1949 | DeGier et al. | |
| 2,747,105 | 5/1956 | Fitzgerald et al. | 106—53 |
| 2,856,303 | 10/1958 | Armistead | 106—53 |
| 2,964,414 | 12/1960 | Dalton et al. | 106—53 |
| 3,046,148 | 7/1962 | Middlesworth et al. | 106—53 |

HELEN M. McCARTHY, *Primary Examiner.*